(12) United States Patent
Swanson et al.

(10) Patent No.: US 8,689,313 B2
(45) Date of Patent: Apr. 1, 2014

(54) REAL TIME STREAMING DATA COMMUNICATIONS THROUGH A SECURITY DEVICE

(75) Inventors: Jon N. Swanson, Queensbury, NY (US); Adam M. Chapweske, Chicago, IL (US)

(73) Assignee: Insors Integrated Communications, Chicago, IL (US)

( * ) Notice: Subject to any disclaimer, the term of this patent is extended or adjusted under 35 U.S.C. 154(b) by 1920 days.

(21) Appl. No.: 11/135,122

(22) Filed: May 23, 2005

(65) Prior Publication Data

US 2005/0283536 A1    Dec. 22, 2005

Related U.S. Application Data

(60) Provisional application No. 60/581,472, filed on Jun. 21, 2004.

(51) Int. Cl.
  *G06F 9/00*    (2006.01)
  *G06F 15/16*   (2006.01)
  *G06F 17/00*   (2006.01)

(52) U.S. Cl.
  USPC ................................ 726/12; 709/231; 726/14

(58) Field of Classification Search
  USPC ........................ 726/2–4, 8, 11–15, 26, 27, 29; 713/150–155, 162, 168, 170; 380/59, 380/255; 709/230–244; 370/351
  See application file for complete search history.

(56) References Cited

U.S. PATENT DOCUMENTS

| | | |
|---|---|---|
| 5,999,979 A | 12/1999 | Vellanki et al. |
| 6,360,265 B1 | 3/2002 | Falck et al. |
| 6,993,595 B1 | 1/2006 | Luptowski et al. |
| 7,043,564 B1 * | 5/2006 | Cook et al. ................ 709/246 |
| 7,047,561 B1 * | 5/2006 | Lee ............................. 726/12 |
| 7,072,341 B2 * | 7/2006 | Xu et al. ..................... 370/392 |
| 7,173,928 B2 * | 2/2007 | Xu et al. ..................... 370/352 |

(Continued)

OTHER PUBLICATIONS

"How to mark Real-Time Streaming Protocol (RTSP) traverse Network Address Translators (NAT) and interact with Firewalls," Westerlund, Network Working Group, Ericsson, Feb. 21, 2003.*

(Continued)

*Primary Examiner* — David Garcia Cervetti
*Assistant Examiner* — Fatoumata Traore
(74) *Attorney, Agent, or Firm* — Greer, Burns & Crain Ltd.

(57) ABSTRACT

An exemplary method of the invention is for connecting a plurality of clients to one another over a computer network for communication of real-time streaming data to one another, with at least one of the clients being separated by a security device from the network. Exemplary steps include each of the clients communicating a request to the server including a client address and a conference identifier, the server using the conference identifier to identify a conference address, and the server communicating a confirmation to each of the clients in a first protocol containing the at least one conference address. The at least one security device recognizes one or both of the confirmation and request as a signal to allow traffic to pass from said conference address to the respective client separated from the network by the security device. Each of the clients communicates real time streaming data to the conference address in a second protocol, and the server communicates real time streaming data received from each of the clients in the second protocol at the conference address to the others of the clients whereby the plurality of clients share real-time streaming data.

20 Claims, 5 Drawing Sheets

(56) References Cited

U.S. PATENT DOCUMENTS

| | | | |
|---|---|---|---|
| 7,274,684 B2* | 9/2007 | Young et al. ............... | 370/352 |
| 7,333,500 B2 | 2/2008 | Roshko | |
| 7,346,044 B1* | 3/2008 | Chou et al. ................. | 370/352 |
| 7,349,948 B2 | 3/2008 | Bussani et al. | |
| 7,362,760 B2 | 4/2008 | Wang | |
| 7,742,429 B1* | 6/2010 | Huang et al. .............. | 370/254 |
| 2001/0032270 A1 | 10/2001 | Koo | |
| 2002/0057716 A1* | 5/2002 | Svanbro et al. ............ | 370/477 |
| 2002/0114333 A1* | 8/2002 | Xu et al. .................... | 370/392 |
| 2002/0120760 A1* | 8/2002 | Kimchi et al. ............. | 709/230 |
| 2002/0122416 A1* | 9/2002 | Xu et al. .................... | 370/352 |
| 2003/0046431 A1* | 3/2003 | Belleguie .................. | 709/246 |
| 2003/0093563 A1* | 5/2003 | Young et al. .............. | 709/245 |
| 2003/0095567 A1* | 5/2003 | Lo et al. .................... | 370/466 |
| 2003/0188001 A1 | 10/2003 | Eisenberg et al. ......... | 709/229 |
| 2004/0128554 A1* | 7/2004 | Maher et al. ............... | 713/201 |
| 2005/0117605 A1* | 6/2005 | Yan et al. ................... | 370/469 |
| 2005/0281260 A1 | 12/2005 | Swanson et al. ........... | 370/389 |
| 2006/0031559 A1* | 2/2006 | Sorokopud et al. ........ | 709/232 |
| 2007/0005804 A1* | 1/2007 | Rideout ...................... | 709/246 |

OTHER PUBLICATIONS

"Real Time Streaming Protocol (RTSP)," Schulzrinne et al., Network Working Group, RFC 2326, Apr. 1998.*

"Adventures in H.323 Videoconference Streaming and Recording," John Langkals, Technology Engineer, OARnet, OARnet H.323 Training, May 2002.*

H. Schulzrinne, et al. "Real Time Streaming Protocol," Network Working Group Request for Comments 2326.

P. Srisuresh, et al. "Middlebox Communication Architecture and Framework," Network Working Group Request for Comments 3303.

P. Srisuresh and M. Holdrege. "IP Network Address Translator (NAT) Terminology and Considerations," Network Working Group Request for Comments 2663.

R. Fielding, et al. "Hypertext Transfer Protocol—HTTP/1.1," Network Working Group Request for Comments 2616.

J. Franks, et all. "An Extension to HTTP: Digest Access Authentication," Network Working Group Request Comments 2069.

"Static NAT Mapping", Eicon Networks, http://www.eicon.com/support/helpweb/safepipe/static_nat.html, 2004.

Baruch Sterman, Ph.D., David Schwartz, "NAT Traversal in SIP", Deltathree, The IP Communications Network, pp. 1-17.

Westerlund et al., "How to Make Real-Time Streaming Protocol (RTSP) Traverse Network Address Translators (NAT) and Interact with Firewalls." Feb. 21, 2003.

Rosenburg et al., "Getting SIP through Firewalls and NATs." Feb. 22, 2000.

NAT Traversal connects, Mandy Address, Feb. 2002, http://www.infoworld.com/articles/ne/xml/02/02/18/020218nenat.html.

Non-Final Office Action mailed Nov. 7, 2008 in U.S. Appl. No. 11/135,011.

Final Office Action mailed Apr. 7, 2009 in U.S. Appl. No. 11/135,011.

Amendment B filed on Mar. 5, 2009 in U.S. Appl. No. 11/135,011.

* cited by examiner

NAT MAPPING:
A - REQUEST PACKET FROM CLIENT; CLIENT ADDRESS=X
B - CONFIRMATION PACKET FROM SERVER WITH SESSION ID; SENT TO ADDRESS=X
C - MAPPER PACKET FROM CLIENT; CONTAINS CLIENT ADDRESS=X; EXTERNAL ADDRESS DATA=X
D - NAT INTERCEPT; REPLACE EXTERNAL ADDRESS DATA X WITH EXTERNAL ADDRESS=Y
E - SERVER RECEIVES MAPPER PACKET WITH INTERNAL ADDRESS=X AND EXTERNAL ADDRESS=Y; STORES MAPPING OF Y=X
F - OUTGOING VIDEOCONFERENCE DATA SENT FROM CLIENT TO SERVER

FIG. 5

PROXY DECODING:
AA - REQUEST PACKET FROM CLIENT; INTERNAL ADDRESS=X; EXTERNAL ADDRESS = Z
BB - PROXY INTERCEPT; REPLACE INTERNAL ADDRESS=X WITH TRANSLATED ADDRESS=Y
CC - CONFIRMATION PACKET FROM SERVER WITH SESSION ID, SENT TO ADDRESS=Z, INCLUDES CONFERENCE ADDRESS CA
DD - PROXY INTERCEPT, REPLACE DESTINATION CLIENT ADDRESS=Y WITH CLIENT ADDRESS=X, TRANSLATES CONF. ADDR. CA TO P
EE - MAPPER PACKET FROM CLIENT ADDRESSED TO P; CONTAINS SESSION ID; EXTERNAL ADDRESS=X
FF - PROXY TRANSLATES ADDRESS P TO CA, DROPS MAPPER PACKET, NAT TRANSLATES EXTERNAL ADDRESS=X TO EXTERNAL ADDRESS =Q; FORWARDS TO CA

REAL TIME STREAMING DATA COMMUNICATIONS THROUGH A SECURITY DEVICE

PRIORITY CLAIM

The present invention claims priority on U.S. provisional application No. Ser. No. 60/581,472 filed on Jun. 21, 2004, incorporated herein by reference.

CROSS REFERENCE

The present invention is related to a U.S. Application filed on the same date as the present application entitled METHODS AND PROGRAM PRODUCTS FOR MAPPING A NETWORK ADDRESS TRANSLATOR, by Swanson et al., commonly assigned to Insors Integrated Communications, Chicago Ill.; which application is incorporated herein by reference.

FIELD OF THE INVENTION

The present invention is related to real time streaming data communication over data networks and through a security device. The present invention is also related to methods, systems, and program products for conducting videoconferences over a data network and through network security devices.

BACKGROUND

Real-time communications including audio and/or video conferencing can be difficult to implement on communications networks such as packet-based networks, including internet protocol ("IP") networks, without compromising existing security mechanisms. Currently proposed solutions require either substantial effort and/or security risks, or are dependant upon specific conferencing platforms.

Communications networks such as computer networks rely on particular protocols to transport data. Packet-based networks, with IP networks being one example, may rely on UDP, TCP, and similar protocols to transport data such as audio or video in a streaming real-time conference. Both of these protocols use the concept of ports to perform multiplexing for higher-level protocols and applications. This involves the presence of two 16-bit identifiers in every packet indicating the sending (source port) and receiving (destination port) processes.

Some applications/protocols are assigned well-known or standard port numbers. However, a static port assignment may be impractical for applications such as multi-user conferencing applications due to their dynamic nature. As a result, most conferencing applications dynamically select ports from some predefined range specific to each application. This port allocation scheme can be problematic when a security device such as a firewall is present on the network.

A firewall may provide security by selectively granting or denying access to the private network. A firewall may be a NAT, a proxy, other device(s), and/or a combination of two or more of these. These devices block or restrict unauthorized incoming data and unauthorized incoming requests from devices on a private network. Firewalls isolate devices "behind" them from a public network, and thereby provide security against unsolicited connections. Firewalls can also restrict the way computers inside can access outside public sites, such as those on the Internet. One technique for establishing a firewall is to maintain a list of "authorized" addresses. Address information contained in a data packet from a remote device can be examined to determine whether the originating source is on the list. Only packets coming from authorized addresses are allowed to pass.

In many two-way streaming data applications, with videoconferences being an example, bi-directional communication must be initiated from behind a firewall towards a public network address. Once connections have been established from the inside out, data may then flow in both directions. Methods for initiating and maintaining a videoconference session through a firewall can be complex.

Widely used standard protocols such as H.323 are used to support some exemplary applications. For example, ITU H.323 standard defines how real-time, bi-directional multimedia communications can be exchanged on packet-based networks. The H.323 protocol uses a User Datagram Protocol (UDP) for the transport of voice and video data. UDP is a connectionless packet-oriented transfer protocol. When a public network transmission uses a connectionless type of protocol such as UDP for voice and video data packets, a security device may block incoming packets from the public network, and may also block outgoing from the private network. Accordingly, security devices such as firewalls can make applications such as videoconferences difficult to implement and use.

There are some proposed methods of enabling applications such as videoconferencing to operate through security devices. One proposed method is to configure the security device or firewall to always allow bi-directional communication on all ports associated with the application of interest. While this is relatively simple, statically opening ports significantly decreases the effectiveness of the firewall. Another proposed solution is to use an Application Level Gateway (ALG) or Middlebox Communication (MIDCOM) device. These are both essentially firewall add-ons that dynamically open and close ports based on information from higher-level protocols. These require an ALG or MIDCOM module specific to the particular application to be configured and installed on every firewall to be used. This is time consuming, complicated, and costly.

Another proposed solution is to bypass the firewall through the use of a gateway placed in a demilitarized zone ("DMZ"). A DMZ is a section of network that lies between an internal and external firewall such that nodes within the DMZ can be accessed without restriction. The gateway then connects nodes from outside the external firewall to nodes inside the internal firewall. This can cause an extra layer of complexity, and increases overhead and security risk. Still another proposed solution is the use of tunneling. This involves encapsulating the conference's stream(s) in some other protocol that is firewall friendly. This adds a sizeable layer of complexity to the application, decreases the effective payload of each data packet, and otherwise decreases performance efficiency. It is also possible for undesirable or dangerous traffic to be encapsulated in this way masquerading as a different protocol.

Other security devices include network address translators ("NAT"), and proxies. NAT's are found on many networks that interface with other networks, including public networks such as the Internet. A NAT may operate in combination with another security device(s), and may, for example, be one component of a firewall. NAT's provide security from the outside public network by translating internal network addresses on outgoing data packets so that they appear as a different address when viewed from outside the NAT. In addition to providing security, NAT translations can also alleviate problems related to the relatively small address space of IP by effectively sharing a few public IP addresses among many hosts.

NAT's commonly perform Network Address Port Translation (NAPT, a.k.a. PAT). This is the translation of a packet's originating client address to a different address that is unique on the public network. This source address data is typically contained in a packet header or external data. A packet sent from a client on the private network may have an originating address including an IP/port pair that is summarized as address=X. A NAT operating between the client and a public network could intercept this packet and replace the external originating address=X with a NAT translated address=Y. The packet would then be communicated into the public network with the external originating address=Y data. As a result, any recipient of the packet on the network will understand that it originated from address=Y. Typically, a NAT only translates fields in a data packet's external, as opposed to its internal, data. Accordingly, a UDP, TCP, or other protocol packet that included the client originating address in its payload would have its header address information translated by a NAT, but not the payload address data.

NAT translation can make it difficult (and in some cases, impossible) for a host on the public network such as a videoconference server to effectively communicate data such as two-way streaming audio and video data with a client. Because of NAT translation, the server receives data packets from the client with a NAT translated address attached. This can complicate communications for several reasons. For example, some communications sessions may be setup with the server through a request that is not subject to NAT translation, with the result that the server may have conflicting address data for the client.

A NAT may be combined with another security device, such as a proxy or proxy server (the terms "proxy" and "proxy server" are used interchangeably herein). A proxy may specifically act on data packets only of particular protocols, and may act on both incoming and outgoing data packets. A proxy may operate to translate address data therein, among other actions. When present in combination with a NAT, a proxy can further complicate conducting communications such as a two-way streaming data event.

SUMMARY OF THE INVENTION

An embodiment of the present invention includes methods and systems for using a streaming protocol such as RTSP to aid network communications. One method of the invention uses a media streaming protocol to provide communications through security devices for real-time multi-user communications, with a real-time audio and/or video conference being one example application for practice of the invention. Artisans will appreciate that other similar protocols will be appropriate for practice of the invention, as will other communications in addition to video/audio conferences.

An exemplary method of the invention is for connecting a plurality of clients to one another over a computer network for communication of real-time streaming data to one another, with at least one of the clients being separated by a security device from the network. Exemplary steps include each of the clients communicating a request to the server including a client address and a conference identifier, the server using the conference identifier to identify a conference address, and the server communicating a confirmation to each of the clients in a first protocol containing the at least one conference address. The at least one security device recognizes one or both of the confirmation and request as a signal to allow traffic to pass from said conference address to the respective client separated from the network by the security device. Each of the clients communicates real time streaming data to the conference address in a second protocol, and the server communicates real time streaming data received from each of the clients in the second protocol at the conference address to the others of the clients whereby the plurality of clients share real-time streaming data. Exemplary real-time streaming data includes audio and/or video data in a videoconference application.

An exemplary program product of the invention is for connecting a client computer to a videoconference server on a network and through a security device. A server computer is connected to the network, and the videoconference includes real time streaming data communicated between multiple participants. The program product comprises computer executable instructions stored in a computer readable memory that when executed by one or more computers cause the one or more computers to perform the steps of: the client to communicate a request to the server containing data including a client address and a conference identifier, the server to use the conference identifier to identify a conference address, and the server to communicate a confirmation to the client in the first protocol containing the conference address. The program instructions further cause the one or more computers to perform the steps of the server communicating real time streaming videoconference data in a second protocol from at least one other conference attendee from the conference address to the client, and the client to communicate real time videoconference data in the second protocol to conference address for communication to the at least one other conference attendee.

DETAILED DESCRIPTION

Before discussing exemplary embodiments of the present invention in detail, it will be appreciated that the invention may be embodied in a method, a system, and/or in a computer program product. For example, a method of the invention may be carried out by one or more users using computers, and a program product of the invention may include computer executable instructions that when executed by one or more computers cause one or more computers to carry out a method of the invention. A program product of the invention, for example, may include computer code that resides on both a server and a client computer, and causes both of the server and client computers to carry out various actions. Further, one or more computer(s) that contains a program product of the invention may embody a system of the invention. It will accordingly be appreciated that in describing a particular embodiment of the present invention, description of other embodiments may also be made. For example, it will be understood that when describing a method of the invention, a system and/or a program product of the invention may likewise be described.

Before describing embodiments of the invention, it will also be appreciated that the present invention will prove beneficial and advantageous when practiced with any of a number of applications for communicating two way streaming data over a data network and through a security device such as a firewall. Examples include real-time streaming data being communicated between a plurality of users during an audio or videoconference. Other applications will be apparent to those knowledgeable in the art. Although exemplary embodiments of the invention are believed to have particular utility when practiced with videoconference applications, the present invention is contemplated for practice with other applications. Illustration herein of exemplary videoconference applications is not intended to limit the scope of the invention.

Figure 1:
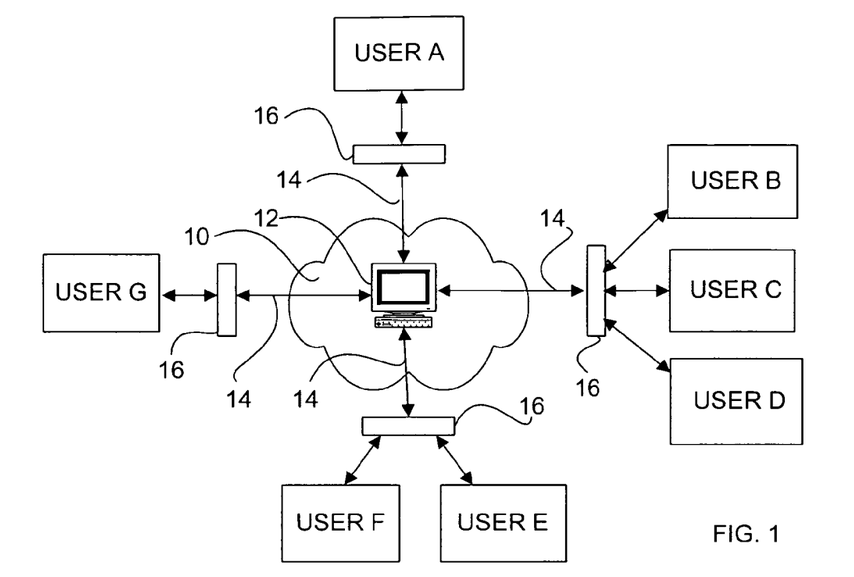
FIG. 1 is a schematic of a network useful for illustrating methods and program products of the invention in a videoconference environment.

Turning now to the drawings, FIG. 1 is a schematic of a network that is useful to describe an exemplary method of the invention. The network shown as a "cloud" 10 includes an interface 12 that links Users A-G to one another. The term "interface" as used herein is intended to be broadly interpreted as comprising one or more components for linking communications between users. It may include, for example, one or more computers having a plurality of communication ports, a software component running on one or more computers that facilitate communications, a networking card(s), a modem(s), and the like. The interface 12 may be referred to in the video/audio conferencing and networking arts as a "bridge" or "server" which may be, for example, a server computer or router having a plurality of ports for interconnecting the Users A-G. As used herein the term port is intended to be broadly interpreted as a physical or logical destination and/or origination point for digital communications. Examples of ports include but are not limited to, network cards, an IP address, a TCP or UDP port number, and the like.

The network 10 may be a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. The network 10 may the internet. Also, the protocol between server 12 and the Users A-G may be that of a server and clients.

The network 10 may be useful for a number of data communication purposes, including the communication of real-time streaming data between two or more of the Users A-G. In one exemplary application, the network 10 is useful to facilitate a virtual meeting between attendees that are physically present at each of the Users A-G. As used herein the term "virtual meeting" is intended to be broadly interpreted as a sharing of real-time communications between participants that are not physically present with one another. Examples of virtual meetings include an audio conference and/or a videoconference during which video and/or audio communications are shared in real-time between a plurality of users. As used herein the term "real-time" is intended to broadly refer to a condition of generally corresponding to actual time. For example, data is real-time if it takes about one minute of data playback to describe an event that took about one minute to occur. Real-time data may be, but is not necessarily, "live" data that is generated and communicated substantially contemporaneously. In a videoconference, for example, multiple participants may be sending and receiving live real-time video and audio data to one another—each is talking to one or more of the others in real-time.

Communications with each of the Users A-G may be carried out on a 2-way basis from the network 10, with data sent to and received from each of the Users A-G over the communications lines 14. These may comprise physically wired connections such as copper wires, optical fiber cables, or the like; or may be wireless connections. Real-time video, audio, and other data may be sent from each of the Users A-G to all others of the Users A-G through the server 12 and over the communications lines 14.

A security device or firewall 16 isolates each of the Users A-G from the network 10. As used herein the term "firewall" is intended to be broadly interpreted as a device, software program, algorithm, or system operative to limit communications access. A firewall 16 may provide security by selectively granting or denying access. A firewall 16 may grant or revoke access based on user authentication, source and destination network addresses, network protocol, time of day, network service or any combination of these or other variables. A firewall 16 can be implemented as an application level firewall or a packet level firewall. The firewall 16 may comprise, for example, a software application running on a computer or other processor based device that intercepts incoming communications data from the network 10, identifies the source of the communications, determines if the source is approved, and allows the data to pass only if the source is approved. Although a firewall 16 has been illustrated separating each of the Users A-G from the network 10, it will be appreciated that some may not use a firewall.

Those knowledgeable in the art will appreciate that communications over the network 10 between the Users A-G may be carried out in any of a number of generally known procedures. For example, known methods of one or more of uni-, multi-, or broad-cast may be used. Also, the data may be streaming. In a streaming video conference application, each user A-G may have one or more cameras, telephones and/or microphones from each of which is streamed a continuous, real-time data stream on a particular multicast address and port number. As used herein the term continuous data stream is intended to broadly refer to a data stream sent in substantially continuous succession, although some degree of intermittency is contemplated. For example, a packetized data stream in IP may be continuous and streaming even though there may be some delay between discrete packets.

One particular exemplary method for communicating and receiving the continuous data streams within the practice of the invention is according to the so-called "Real-time Transport Protocol" or "RTP." RTP is a widely supported Internet-standard protocol for the transport of real-time data, including audio and video. It can be used for media-on-demand as well as interactive services such as Internet telephony. RTP consists of a data and a control part. The latter is referred to as RTCP. The data part of RTP is a thin protocol providing support for applications with real-time properties such as continuous media (e.g., audio and video), including timing reconstruction, loss detection, security and content identification. RTP data is packetized in separate packets from RTCP control data, and RTP data is typically communicated across "data ports" while RTCP control data is communicated across "control ports."

Figure 2:
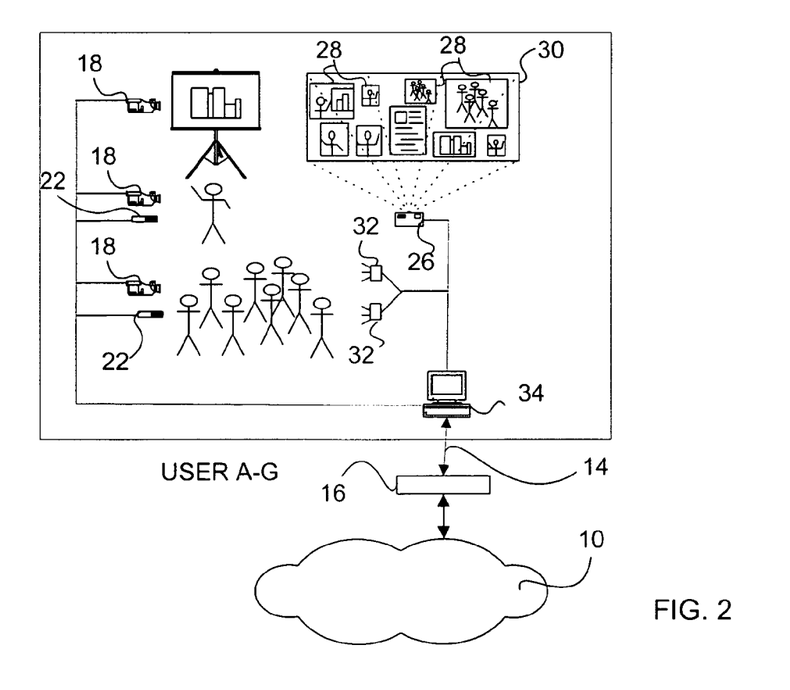
FIG. 2 is a schematic of a user of the network of FIG. 1.
Figures 3, 4:
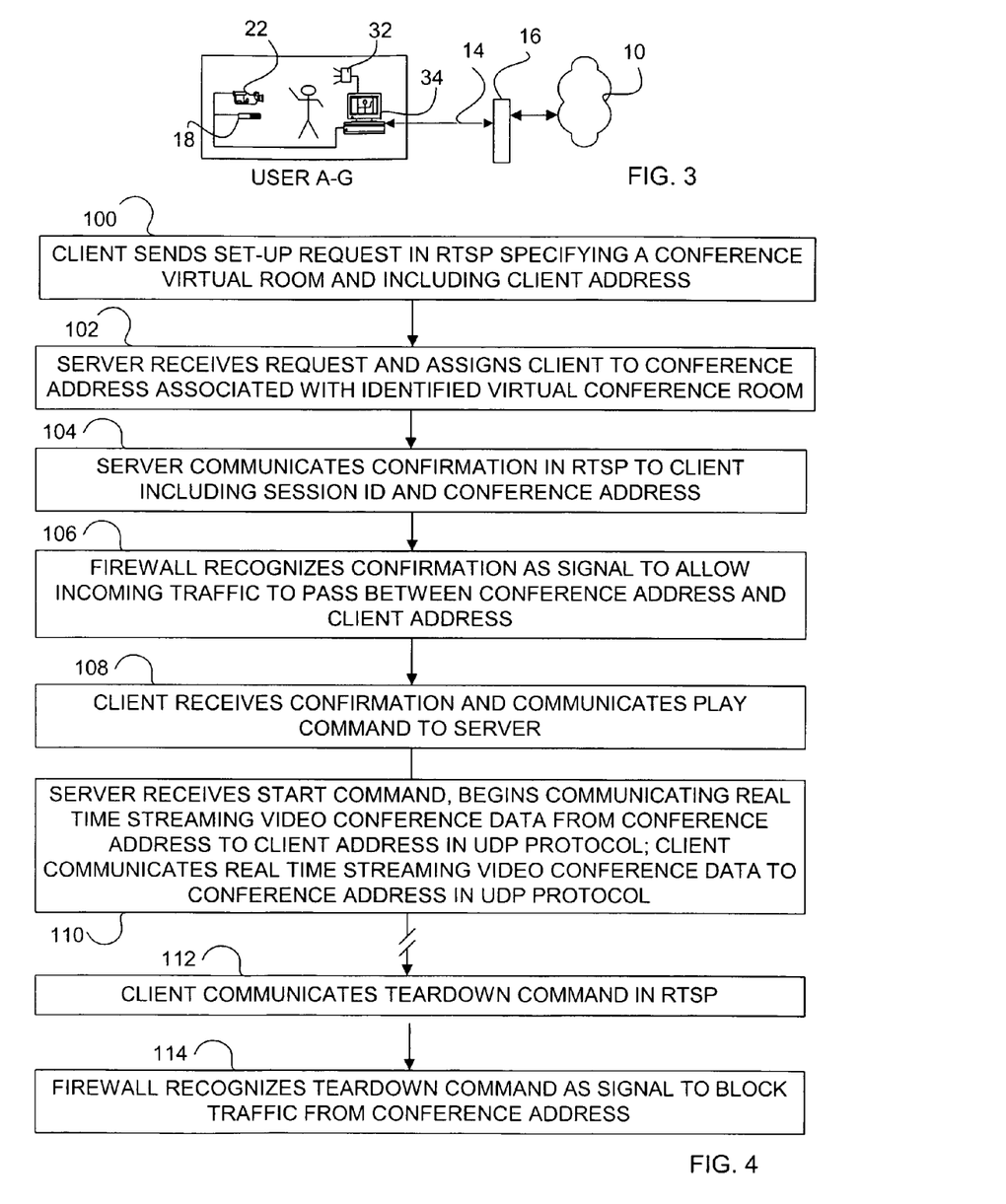
FIG. 3 is a schematic of one alternate user of the network of FIG. 1.
FIG. 4 is a flowchart illustrating one exemplary method of the invention.

Communications of the streaming real-time data between Users A-G may be further appreciated through consideration of the schematic of FIG. 2 that shows an exemplary of the Users A-G in detail. The Users A-G may be conference rooms that include multiple individuals that are all participating in the video conference in some manner. Users A-G include a plurality of cameras 18. The cameras 18 may be trained on different people or things at the Users A-G, with an example being one camera 18 at a presentation board, one camera 18 at a speaker, and one camera 18 at an audience. A first microphone 20 may be provided for receiving audio from the speaker and a second microphone 20 for receiving audio from the audience. Although not illustrated, other cameras, microphones, computers, gateways, firewalls, multi-plexers, co/decoders and like devices may also be present. Also, it will be understood that FIG. 2 is exemplary only, and that a multitude of other configuration are possible for Users A-G, which may also include many other devices other than cameras 18 and microphones 20. FIG. 3 illustrates another exemplary configuration for any of Users A-G. In FIG. 3, only a single camera 18 is provided and a single microphone 20. This might be useful, for example for allowing a single individual at a temporary location using a portable camera 18 and microphone 20 to participate in a videoconference.

In an exemplary videoconference, each of the Users A-G not only sends video and audio data, but likewise receives video, audio, and other data communicated from some or all of the other Users A-G. Referring once again to the schematic of FIG. 2 by way of example, one or more projectors 26 may be provided to project real-time video images 28 from one or more of the other Users A-G on a screen 30. Any number of video images may be provided that show video data in real-time from any number of other cameras or other sources located at the other users. For example, the user A may simultaneously display video data streams from each of the other users B-G. Further, the video images displayed may include charts, graphs, documents, other digital files, replayed video files, and the like. One or more speakers 32 may also be provided to play real-time audio from the other users or other sources.

A particular example of a data file in addition to audio and video data includes shared documents having text, images, numerical values, and the like. For example, within a videoconference or virtual meeting different Users At different locations may desire to all work on a single document. In such circumstances, continuous updates of the document should be communicated between users.

One or more computers 34 may be provided at each of the Users A-G to receive and send all of the video, audio, documents, digital files and other data at the standard user A. An application program, such as an RTP application, may be running on the computer 34 that provides signal coding/decoding, compression/decompression, coordinates receiving and sending of the data streams, and controls some other aspects of sending and receiving of the data streams. For example, the computer 34 may be used to control which or how many video images 28 are displayed on the screen 30, to size the images 28, to set audio levels for the speakers 32, and the like. It will be appreciated that many alternatives to the computer 34 are possible, including dedicated processor based devices and the like.

In exemplary videoconference and other virtual meetings, each discrete data stream that is communicated may have a unique identifier associated with it. By way of example, methods, program products, and systems of the invention may be practiced across packet switched networks 10 that are configured for carrying discretely packetized data communications, with internet protocol ("IP") communications being one example, and RTP communications being a more specific example. In IP communications, continuous data is packed into discrete packets and provided with a destination address. The address may be a digital string, for instance, that identifies a port at the server 12 (FIG. 1). Each of the discrete packets of data may also include a unique identifier, such as a digital origination address.

The origination address may be, for instance, a digital string that identifies the computer 34, camera 18 or microphone 20 at the user A-G from which it originated (FIGS. 2-3). Within the RTP protocol, identifier information may be embedded into the header portion of individual packets by the RTP application programs running on the computers 34. For example, a particular data stream may have source identifying information such as an SSRC ("synchronization source" in RTP protocol) and/or another identifier that includes the user name, camera number, and IP address of the computer 34. The SSRC identifier carried in the RTP header and in various fields of RTCP packets is a random 32-bit number that is required to be globally unique within an RTP session.

According to the configurations of FIGS. 1-3 a real-time audio or videoconference, or other virtual meeting can occur between the Users A-G. Users A-G may virtually "attend" a rich, immersive, and extensive virtual meeting that includes audio and/or video, and/or other streaming data shared in real-time. Participants at each of the Users A-G may simultaneously hear and/or view data from all others of the Users A-G. Such meetings may be desirable for corporations, universities, government, and other groups of people located remotely from one another that find it useful to interact in an environment that allows a greater level of intimacy than a phone call.

For convenience, the meetings may be organized in virtual "rooms" that correspond to ports at the server 12. It will be appreciated that it is not necessary that the ports be physically contained within a server computer 12 and may be physically removed from the server 12. The ports are able to be controlled and connected to by the server 12, however. Users A-G thus may select which of the others to meet with by selecting a virtual room (port) to meet in. If Users A, C and G, for instance, want to have a conference, they may communicate with one another beforehand and agree to meet at a particular time in the "Schlitz" room. By connecting to the server 12 at the prescribed time and specifying the "Schlitz" room, the Users A, C and G will be connected to the same port(s) at the server 12.

As discussed hereinabove, the firewalls 16 may complicate the video conferences and similar application run over the network 10. Methods, systems, and program products of the invention provide beneficial solutions to many of these complications. An exemplary method of the invention takes advantage of available protocols that are supported by many security device providers. It has been discovered that exploiting such a protocol in combination with other steps of methods of the invention provides an effective, low-cost, secure, and easily implemented solution for communicating videoconference data through a security device.

One exemplary protocol useful for some steps of methods of the invention is widely supported for remotely controlling stored media streams. The retrieval and control of stored media streams from remote servers has become a common application. Examples of this include viewing stored news clips, movie trailers, or entire television shows across a network. These media clips are stored on a server, and some mechanism exists to allow users to direct the playback of these streams so they may be viewed on a local terminal. One exemplary protocol suitable for accomplishing this is the Real Time Streaming Protocol ("RTSP"). RTSP is an application level standard for facilitating one-way incoming streaming data through a security device. RTSP has been referred to as the "Internet VCR remote control" protocol. It is similar in concept and design to Hyper Text Transfer Protocol ("HTTP"). RTSP involves applying one or more methods to resources specified by their resource identifier ("URI"). For example, just as HTTP may be used to "GET" or "PUT" a document identified as http://webserver/document.html, RTSP may be used to "PLAY" or "RECORD" a stored media stream identified as rtsp://mediaserver/twister/audiotrack.

RTSP uses the notion of "sessions" to maintain state information during playback of the stored file. An RTSP session represents a complete RTSP transaction, which consists of initializing, playing/recording, and deinitializing one or more related streams. Initialization consists of a "SETUP" request/response, which includes the specification of transport details of the associated stored stream. Included in these details are the protocol type and the client and server ports to be used. These details provide the information necessary to implement an application level gateway for RTSP. Many firewall vendors include such RTSP support in their products.

Exemplary methods of the invention utilize the RTSP protocol in combination with other steps to connect a user to a videoconference through a security device. Referencing FIG. 1 by way of example, each User A-G is capable of sending and receiving audio, video, document data, and possibly other real-time communications or streams. The conferencing server 12 receives this traffic from each User A-G, processes it, and then communicates it to the other Users A-G as appropriate. The server 12 can be a processor-based system containing instances of a server application. Each of these instances binds to one or more ports and retransmits data between endpoint Users A-G. That is, each server instance corresponds to a "meeting place" or "virtual room" where video, audio and data streams from Users A-G are linked to one another.

An exemplary method of the invention may be further illustrated by consideration of the flowchart of FIG. 4 in combination with the schematic of FIG. 1. The client such as any of the Users A-G first issues a request in RTSP or a like protocol to the server, which includes a conference identifier. (block 100). The conference identifier may be, for instance, the assigned name of a "virtual room" that corresponds to statically or dynamically allocated port(s) over which videoconference attendees will communicate with one another (e.g., the "Schlitz room"). It may also be a particular conference name or code that has been assigned and agreed to by the participants (e.g., "conference number 3234"). The server may publish a list of "rooms" or meetings on the network 10 from which the Users A-G identify the meeting and/or room that they wish to attend. The conference identifier is preferably known to the server, and is stored in a memory accessible to the server along with the associated conference address.

The server receives the request, and uses the conference identifier to identify a conference address associated with the conference identifier. (block 102). As used herein, the term "conference identifier" is intended to be broadly interpreted as referring to a communications destination. In the case of a video conference, for instance, a conference identifier may be the name of a video conference (e.g., "the May 10 Alpha project meeting"), a virtual room name (e.g., "the Schlitz room"), or the like. In the case of an audio conference to be held with one or more others, a conference identifier may refer to the name or identifying information of the one or more others. The conference identifier, for instance, may be a phone number that is associated with a particular user.

The term "conference address" is intended to be broadly interpreted as meaning a network location. It may be, for example, a network address such as an IP address and/or one or more server ports over which a video or audio conference will be communicated. It may include one or a plurality of individual addresses that correspond to a single meeting, with an example being one IP address and two or more ports. A first port may be for communicating streaming video data and a second for communicating streaming audio data. Additional ports for other data, with an example being documents or images. The server may identify this information through retrieval from the memory where it is stored.

The server then communicates a confirmation in RTSP to the client that contains the conference address. (block 104). The confirmation may also include a unique session ID that the server has assigned to the communications with the client, and/or other data such as a codeword that can be used to uniquely identify the client to the server. When the confirmation passes the firewall 16, it is intercepted and recognized by the firewall 16 as a signal to allow traffic from the server to the client address to pass therethrough. (block 106).

That is, the firewall 16 responds to the confirmation by establishing a rule that particular traffic may pass between the client and the server. The firewall 16 has preferably been pre-configured to recognize RTSP requests and/or confirmations by its provider. That is, the firewall 16 comes from its provider with the functionality of supporting RTSP, or whatever other suitable protocol is being used for the request and confirmation. The client receives the confirmation and subsequently communicates a play command to the server. (block 108).

The server then begins communicating real time streaming videoconference data to the client at the client address. (block 110). This data may include audio and video data from all others of the Users A-G in addition to other data. Unlike the request and confirmation, this data is not communicated in RTSP, but instead in a more suitable protocol for use with real time streaming data. UDP and TCP are two exemplary and suitable protocols. If a "hole" had not been created through the firewall 16 through the step of sending a confirmation in RTSP protocol, the firewall 16 would deny passage of the UDP/TCP data. But because a "hole" in the firewall has been opened to all traffic originating at the conference address that is destined for the client address, it is allowed to pass. The client also communicates real time streaming videoconference data to the conference address so that it may be communicated to some or all of the other Users A-G. (block 110).

At some point the videoconference will terminate, and/or the client may wish to exit it. To do so, the client can communicate a teardown command in RTSP protocol to the server 12. (block 112). As this passes the firewall 16, it is recognized by the firewall as a signal to deny passage of incoming traffic from the conference address destined to the client address. (block 114). In effect, the firewall "closes the hole" that was previously opened by the confirmation command. The teardown command also has the effect of informing the server that the client participation in the videoconference is complete, and that it can free resources that were formerly being used to service the client's videoconference participation.

By way of further example, the steps of FIG. 4 may be further illustrated by consideration of the below examples of a complete RTSP transaction between a client (e.g., any user A-G of FIG. 1) and a server (e.g., bridge or server 12 of FIG. 1), in RTSP protocol syntax.

```
1. Client to Server (request) (block 100):
    SETUP rtsp://foo/conference-server/X RTSP/1.0
        CSeq: 1
        Transport: RTP/AVP;unicast;client_port=8000-8001
```

It is noted that although the request is preferably in a first protocol such as RTSP that is recognized by many security devices, the present invention contemplates that this is not necessary. When using RTSP, for example, the "hole" in the firewall 16 is created upon reception of the confirmation. Those skilled in the art will appreciate that steps may be practiced that include sending a request in a protocol other than RTSP to the server, and the server responding with an RTSP protocol confirmation.

When the server 12 receives the request (block 102), it responds by filling in the port range that the virtual room X is bound to (e.g., ports 10000-10001), and communicating this back to the client (any user A-G):

```
2. Server to Client (confirmation)(block 104):
    RTSP/1.0 200 OK
        CSeq: 1
        Transport: RTP/AVP;unicast;client_port=8000-8001;
            server_port=9000-9001
        Session: 12345678
```

When the confirmation that confirms session details (message 2. above) passes through the firewall 16, the firewall recognizes this as a signal to add a rule to allow traffic between "server_port" and "client_port." (block 106). Put another way, a hole in the firewall is created. Advantageously, many security devices are pre-configured by their providers to support protocols such as RTSP. It is noted that the particular point at which the firewall creates a rule allowing traffic may occur at other events in addition to or combination with receiving the confirmation. For example, some firewalls may create the rule to allow traffic (i.e., create a "hole"), or at least begin the rule creation, when the setup request is received at the firewall. Or the rule may be created when the PLAY command passes the firewall. For purposes of the present invention, the particular event that triggers the creation of the rule is not important, so long as it is created prior to communication of real time streaming data. It is believed that most commercially available security devices create the rule upon the passing of the inbound confirmation.

If the conferencing client (user A-G) is not bound to the same host as the RTSP client, the "destination" parameter may be used for the confirmation:

```
3. Client to Server:
    Transport: RTP/AVP;unicast;client_port=8000-8001;
        destination=conferencing-client.foo
```

Similarly, the "source" parameter can be included if the conferencing server is not bound to the same host as the RTSP server:

```
4. Server to Client: ...
    Transport: RTP/AVP;unicast;client_port=8000-8001;
        destination=conference-client.inSORS.com;
        server_port=10000-10001;
        source=conference-server.foo
    Session: 12345678
```

Next, the client (user A-G) issues an RTSP PLAY request to indicate it wishes to begin receiving from the conferencing server 12:

```
5. Client to Server (start communicating videoconfernce data)(block 108):
    PLAY rtsp://foo/twister RTSP/1.0
        CSeq: 2
        Session: 12345678
6. Server to Client (playback):
    RTSP/1.0 200 OK
        CSeq: 2
        Session: 12345678
```

At this point the firewall 16 receiving the above messages formalizes the "hole" to allow communication between server 12 port 10000 to client (user A-G) port 8000. The videoconference communications may then be sent over client port 8000 in a protocol such as UDP. It is noted that in some invention embodiments, the firewall At some point, the videoconference ends, and/or a particular User A-G wishes to exit. In some methods of the invention, a signal is communicated in the first protocol to the server to indicate that no additional data should be communicated to the client. (block 112). In RTSP, this signal is the "Teardown" command. When an RTSP Teardown is received by the security device, the rule added to the firewall when the confirmation passed it (statement 2. and block 106 above) is removed. That is, the "hole" in the firewall is closed. Below is an exemplary Teardown exchange in RTSP:

```
7. Client to Server (end session):
    TEARDOWN rtsp://foo/twister RTSP/1.0
        CSeq: 3
        Session: 12345678
8. Server to Client (ended):
    RTSP/1.0 200 OK
        CSeq: 3
```

Although exemplary steps of a method of the invention have been illustrated with reference to connecting a single User A-G to a videoconference, it will be appreciated that methods of the invention may further include steps of connecting other of the Users A-G to the videoconference. A videoconference generally includes at least two participants communicating with one another, and videoconferences in practice often involve a multiplicity of participants. More than ten Users A-G, for example, is not uncommon in some applications. A method of the invention may be used to connect all of the Users A-G to one another over the conference address so that they may communicate videoconference data to one another. By way of particular example, the steps of FIG. 4 may be practiced with a second of the Users A-G to connect the second User through a second firewall 16 to the same videoconference that a first User has already been connected to using the steps of FIG. 4 as described above.

In brief summary, this would include the second client sending a second request in RTSP (block 100), the server 12 receiving the request and identifying the conference address (block 102), the server sending a second confirmation to the second client (block 104), and the second firewall recognizing the second confirmation as a signal to allow passage of traffic from the conference address to the client address (block 106). After the client issued a start command, videoconference data would then be communicated between the server and the client through the firewall 16 until a teardown command in RTSP protocol was issued. (blocks 108, 110, 112). Other methods of the invention may likewise include repeating the steps of FIG. 4 to connect third, fourth, fifth, and more users to one another via a server such as server 12 to share real time, streaming videoconference data with one another. Many videoconferences that will benefit from methods and program products of the invention, in fact, will include a multiplicity of users that have all been connected to the videoconference through practice of a method of the invention.

Through exemplary methods of the invention described above, numerous advantages and benefits have been achieved. For example, methods of the invention leverage the support for RTSP and similar streaming protocols that is existing in many commercially available security devices to provide a convenient mechanism for penetrating the security device. No application level gateway, other add-on, or complicated tunneling method is required. This results in significant cost and time savings, and can greatly simplify setting up a streaming data sharing event such as an audio or video conference through one or more security devices.

Exemplary Application Control Steps

Practice of methods of the invention also allow for other benefits and advantages. For example, when practicing a method of the invention using a protocol such as RTSP and with an application such as a real-time videoconference, use of the protocol as described provides the ability to dynamically launch instances of the videoconference application when they are needed, and remove them when they are not. The term "videoconference application" is intended to be broadly interpreted as referring to a software program operating on a computer such as the server 12 (FIG. 1) to facilitate a videoconference. A videoconference application may also be known as a videoconference server application, videoconference server, or videoconference software server application. A videoconference server may embody a program product of the invention that is useful to carry out some or all of the steps of a method of the invention.

Referencing FIG. 1 for illustration, in a typical videoconference an instance of a videoconference application may be running on the server 12 for each videoconference being conducted over the network 10. When a plurality or multiplicity of conferences are simultaneously conducted over the network 10, keeping a corresponding number of conference applications running on the server(s) 12 can tax resources. Some methods of the invention address this by including a step of only launching a conference application on the server 12 when a request has been received from a client such as one of the Users A-G.

By way of example, a videoconference application could be launched on the server 12 only after receiving the request generated in block 100 of FIG. 4 from the first of the Users A-G to "check in" to a conference. Subsequent of the Users A-G will be served by the launched application. An additional step of shutting down the application when the last User A-G client exits the videoconference (i.e., no remaining clients in the conference) may also be performed. For example, when each User A-G exits the videoconference they may communicate a teardown command (block 112). The server 12 may determine if any Users A-G remain participating in the videoconference, and if not it will end the application.

In addition to launching and taking down videoconference applications, arbitrary videoconference parameters may be set/retrieved by taking advantage of a streaming protocol such as RTSP. For example, the RTSP SETUP (the request of FIG. 4, block 100) and RTSP SET_PARAMETER and GET_PARAMETER commands may be used to establish various parameters of a videoconference. Exemplary steps include the client issuing commands that utilize such parameters to set priority levels, obtain communication statistics information, or enable "bandwidth throttling" (for the entire conference or for a single endpoint). "Bandwidth throttling" as used herein is intended to refer to methods of dynamically controlling bandwidth between network communications nodes, and is described in detail by commonly owned and co-pending U.S. patent application Ser. No. 10/993,266, herein incorporated by reference. Generally, bandwidth throttling provides for dynamic throttling of bandwidth communicated between a User A-G and the server 12 over the link 14 to avoid delay and/or lost packets. One exemplary set of method steps for initiating a bandwidth throttling application carried out by a computer and expressed in computer code utilizing RTSP syntax is as follows, where "autobandwidth" refers to a set of steps for accomplishing bandwidth throttling:

```
1. Client to Server:
    SET_PARAMETER rtsp://foo/conference-server/X RTSP/1.0
    CSeq: 421
    Content-length: 19
    Content-type: text/parameters
    autobandwidth: on
2. Server to Client:
    RTSP/1.0 200 OK
    CSeq: 421
3. Client to Sever:
    GET_PARAMETER rtsp://foo/conference-server/X RTSP/1.0
    CSeq: 422
    Content-length: 15
    Content-type: text/parameters
    autobandwidth
4. Server to Client:
    RTSP/1.0 200 OK
    CSeq: 422
    Content-length: 19
    Content-type: text/parameters
```

Exemplary Access Control Steps

In some methods of the invention, using a protocol such as RTSP may also provide a means to control access to a videoconference. Referring to FIG. 1 for illustration, the server 12 may be running an RSTP software server application that manages access to a videoconference. Exemplary steps include the RTSP software server registering a user A-G with a videoconferencing software server application also running on the server 12 when it receives a request (e.g., an RTSP SETUP command), and un-registering the endpoint when it receives a corresponding teardown command (e.g., RSTP TEARDOWN). The RTSP server then has the ability to maintain reports of which of the Users A-G have accessed which videoconferences when. Steps of a method of the invention may include storing information including which users were present in which videoconferences for what times.

Other exemplary method steps include the RTSP software server application enforcing an authentication scheme to the User A-G before access to a videoconference is allowed (e.g., HTTP "Basic" or "Digest" authentication.) An exemplary authentication transaction suitable for practice in a method of the invention is:

```
1. Client to Server (attempt to join conference):
     SETUP rtsp://foo/X RTSP/1.0
     CSeq: 1
     Transport: RTP/UDP; client_port=8000
2. Server to Client (Require Authorization):
     RTSP/1.0 401 Unauthorized
     CSeq: 1
     WWW-Authenticate: Digest <auth-param>
3. Client to Server (provide authorization)
     SETUP rtsp://foo/X RTSP/1.0
     CSeq: 2
     Transport: RTP/UDP; client_port=8000
     Authorization: Digest <auth-param>
4. Server (authorize and add to conference):
     RTSP/1.0 200 OK
     CSeq: 2
     Transport: RTP/UDP;client_port=8000;server_port=10000
```

Artisans will appreciate that this representation is exemplary only, and that in practice some additional detail may be useful. For example, the RTSP server registers endpoints according to the information available in SETUP requests. This includes the "client_port" parameter and possibly the "destination" parameter (it's implied the message's source address is used if this parameter is not supplied.) Under certain situations this is sufficient information, but the presence of network address translators complicates things.

Exemplary NAT Mapping Steps

Embodiments of the present invention also contemplate communicating videoconference data through a network address translator, or NAT. In the prior art, NAT translation has made it difficult (or impossible) for a host on the public network such as the server 12 to effectively communicate two way streaming data such as videoconference data with a client such as User A. Because of NAT translation, the server 12 doesn't receive data packets from the client with its actual address, but instead with a NAT translated address. The server 12 therefore doesn't have sufficient information to determine the client's address.

For this and similar reasons, NAT translation can cause difficulties and complications with videoconferences and similar applications. For various reasons, a NAT may not translate the internal data of the request sent in methods of the invention, particularly if the request is in RTSP protocol. As a result, when practicing a method of the invention such as that illustrated by FIG. 4 where a NAT is present in addition to the firewall 16, the original RTSP request sent by one of the Users A-G to the server 12 will include the User's un-translated address information, but subsequently communicated data packets in a second protocol will arrive with a translated originating address. The server therefore may not recognize the subsequent data with the translated address as originating at the client. To address this and similar problems, embodiments of the invention include steps for mapping or decoding a NAT translation.

Figure 5:
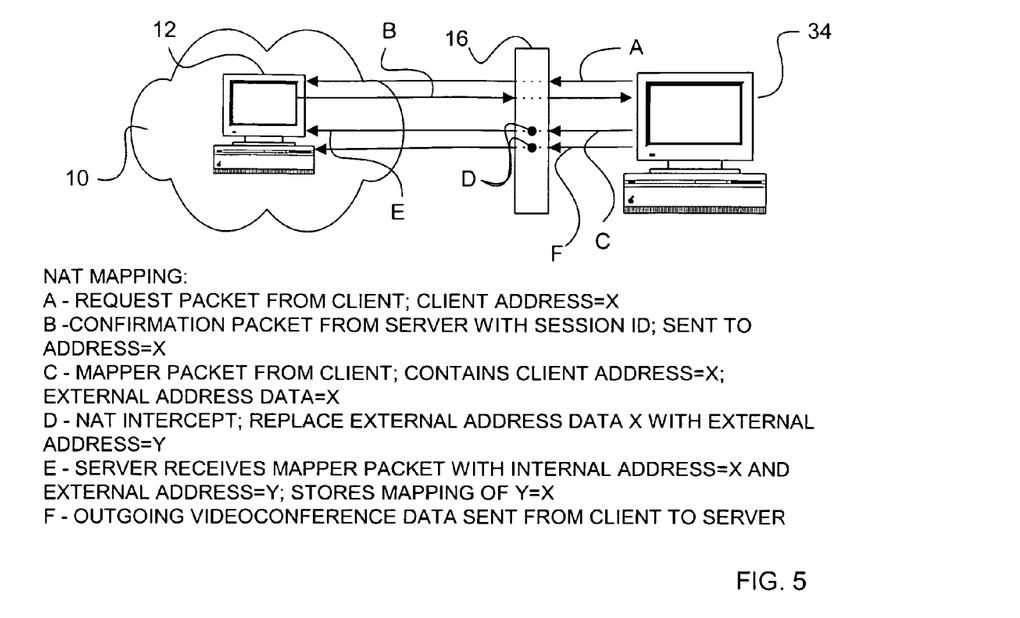
FIG. 5 is a schematic useful to illustrate exemplary steps of mapping a NAT.

Reference to FIG. 5 will be useful to illustrate one exemplary embodiment of the invention useful for mapping a NAT. At A, the User or client sends a request in RTSP or similar protocol to the server 12 on network 10 to initiate videoconference participation. The request includes an address specified by the client at which it desires to receive streaming data. When using RTP protocol for streaming data, this may be an RTP address/port. For convenience herein, this may be referred to as the client address X. At B, the server receives the request, extracts the client address of X, and sends a confirmation to the client.

Exemplary methods of the invention map a NAT translation. As used herein, the term "map" when used in this context is intended to be broadly interpreted as to decode, decipher, resolve, determine a coding scheme, or the like. To map a translated address, for instance, is to determining the un-translated address: if a NAT translates address X to Y, to map that translation is to determine that Y=X. One exemplary method for mapping a NAT translation includes the step of the client sending a dummy or mapper message at C to the server 12, with internal data including the client address X. The terms "dummy message" and "mapper message" are used interchangeably, are used for convenience and are not intended to have any special meaning outside of the meaning attributed to them herein, and are intended to be broadly interpreted as a data communication that may be one or more discrete packets. When this mapper message passes the firewall 16 the NAT intercepts it at D and translates the external source address information from X to Y. The server receives the mapper message at E, and extracts the internal data of client address=X and the external source data showing client address=Y. The mapping of X=Y is then recorded in a memory.

The mapper message may be configured in any number of ways for recognition as a mapper message, with examples including its internal data including some flag that causes the server to recognize it for what it is. Also, those knowledgeable in the art will appreciate that the mapper message might include information other than the client address X that will allow the server 12 to map the NAT translation of X=Y. Any data that identifies the client to the server 12 could be used. For example, when the server 12 initially receives the request, it may assign a unique session ID to the communications session with the client. This session ID may be communicated to the client in the confirmation. The client could include the session ID in the mapper message, which the server could then use to identify the client as the source of the mapper message. Likewise, some other unique identifier could be communicated to the client from the server in the confirmation that could be included in the mapper message, with examples including a codeword, client address or the like.

Once the server 12 has the mapping that relates X to Y, all further data that arrives from the client (with an example being the streaming videoconference data communicated at F) with external address information showing an address of Y will be recognized as originating from the client having the address X. Similarly, the server can communicate to the client using the destination address Y.

Exemplary NAT/Proxy Mapping Steps

A proxy may be present and operate in combination with another security device(s), including a NAT or other firewall. Proxies are most often found in combination with a NAT. The firewall 16 of FIG. 1, for instance, may include a NAT and/or a proxy. A proxy generally sits at the application level above a NAT. A proxy may complicate videoconference communications. Some embodiments of the present invention include steps to map a NAT when a proxy is present in combination therewith.

Figure 6:
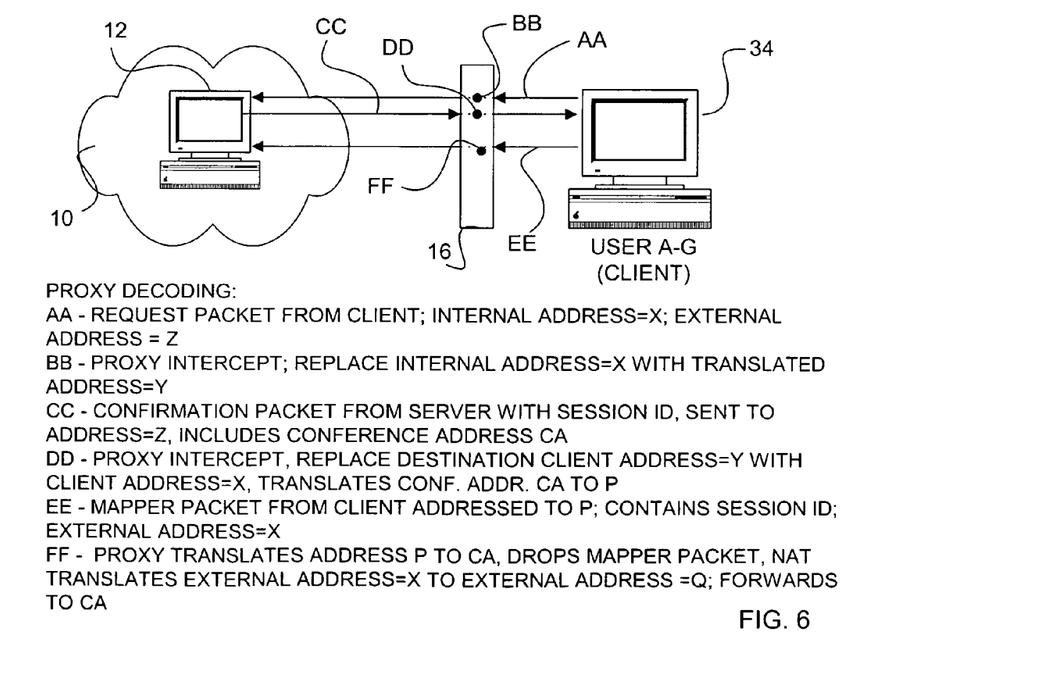
FIG. 6 is a schematic useful to illustrate exemplary steps of mapping a proxy.

Reference to FIG. 6 will be useful to illustrate one such exemplary invention embodiment. The client communicates a request at AA in a first protocol, with RTSP being an example. The request has internal data including a client address of X, which may be a designated address that the client has selected for sending and receiving a particular protocol data such as streaming RTP data. The first protocol proxy server, such as an RTSP proxy integrated with the NAT at the firewall 16 recognizes the packet based on its protocol as one that it should intercept and proceeds to intercept the request at BB. The proxy translates the internal client address from X to a new proxy translated client address of Y. This proxy translated address Y can be thought of as a "forwarding" address from which the proxy will forward incoming communications received from the network to the address X. For practical purposes, the proxy intends the outside world (network 10) to "see" the client at the proxy translated address Y.

The server 12 receives the request including the internal proxy translated address of Y. At CC the server 12 communicates a confirmation in the first protocol to the client. The confirmation includes a conference address CA that may be an IP address and one or more ports. This is the location at which streaming data will be sent to and received from, which may for example a server IP address/port(s). The confirmation also includes data useful to identify the client with, such as a unique session ID, a codeword or the like. The confirmation may also include internal data showing the address of Y for convenience (e.g., it is convenient if the confirmation includes pertinent information summarizing the communications session in one packet: client source address, client proxy forwarding address and conference address).

The proxy server may block incoming traffic not addressed to the proxy forwarding address of Y. The proxy server recognizes the confirmation as one that should be intercepted based on its protocol (e.g., RTSP), intercepts it at DD, extracts the internal address data of Y and recognizes this as the translation for X. The proxy also extracts the conference address CA provided by the server and replaces it with a proxy translated conference address of P. The confirmation is then forwarded to the client.

As a result of these communications and the proxy server's actions, the server 12 has recorded the client address for communicating streaming data to as the proxy translated address of Y. Subsequent data sent to this proxy translated address Y may be forwarded by the proxy to the specified client address of X. The client, however, received the confirmation indicating that the conference address was the proxy translated proxy address of P. The client therefore will communicate outgoing streaming data to the address P. When the proxy receives this at P, however, it may not forward it since the RTSP or similar protocol proxy is not configured to support outgoing data. Or, the proxy may forward the data to the server but the source address/port pair may be translated, potentially to something other than Y.

To map the NAT (in the presence of the proxy), this exemplary method of the invention includes a subsequent step of the client sending a mapper message in a second protocol at EE which contains data that identifies the client to the server 12. The identifying data may be, for example, the client address, the session ID or the codeword that was contained in the confirmation. The mapper message is sent from the client address X to the destination address P. It will include an external source address of X. Through the combination of the NAT and proxy, the mapper message may forward the mapper to the conference address CA with its source address data translated, so that it arrives at the server with address data Q.

When the server 12 receives the mapper message, it will recognize the identifying data such as the session ID from the internal data, but the NAT translated address of Q will be unknown. The server 12 then consults a memory in which the session ID (and/or codeword or other information useful to identify the client with) and other information has been stored, including the address of Y that the server associates with the client and the session ID. The server retrieves the Y address from this memory. The Q address is added to this memory as an additional address corresponding to the client, and future incoming data having a Q address will be recognized as coming from the client.

Accordingly, the server 12 now has sufficient information to map the NAT and each of the server and client have sufficient information to carry on two-way streaming communications through the NAT and proxy. The client will send streaming data from address X to the proxy forwarding address of P. Because this data is in a second protocol, it will be dropped by the proxy server and picked up by the NAT which will translate the address of X to Q. The server will receive it and recognize it as originating at the client. The server will communicate real-time streaming data to the address Y, which will then be forwarded to the client.

Exemplary Proxy/NAT Detection and Mapping Steps

In still an additional exemplary embodiment of the invention, steps are provided for determining whether a particular security device includes a NAT, or a NAT and proxy combination, and for mapping any and all of these devices. It has been discovered that these exemplary steps offer useful benefits and advantages in many applications where prior knowledge concerning a security device configuration exists (i.e., whether one or both of a NAT and a proxy need to be traversed). The exemplary method provides a means for automated discovery of whether a security device includes a NAT or a NAT and proxy combination, and furthers the NAT and Proxy Mapping examples provided above.

Figure 7:
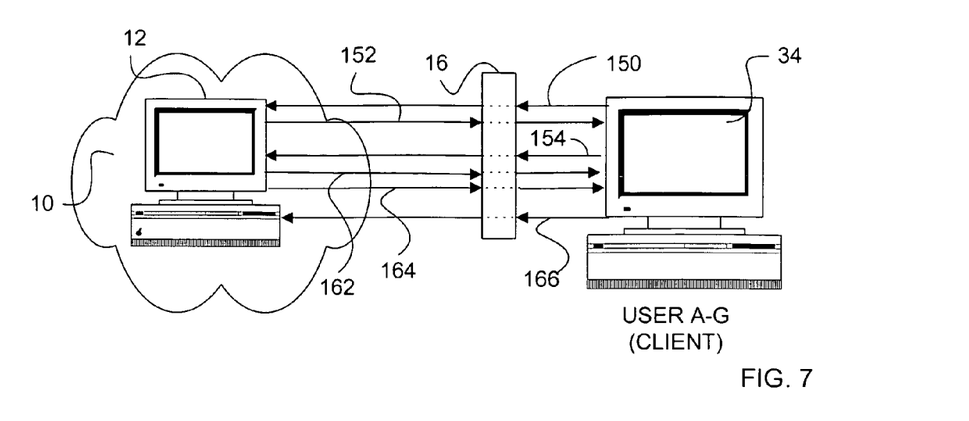
FIG. 7 is a schematic useful to illustrate still additional exemplary steps of an embodiment of the invention in combination with the flowchart of FIG. 8.
Figure 8A:
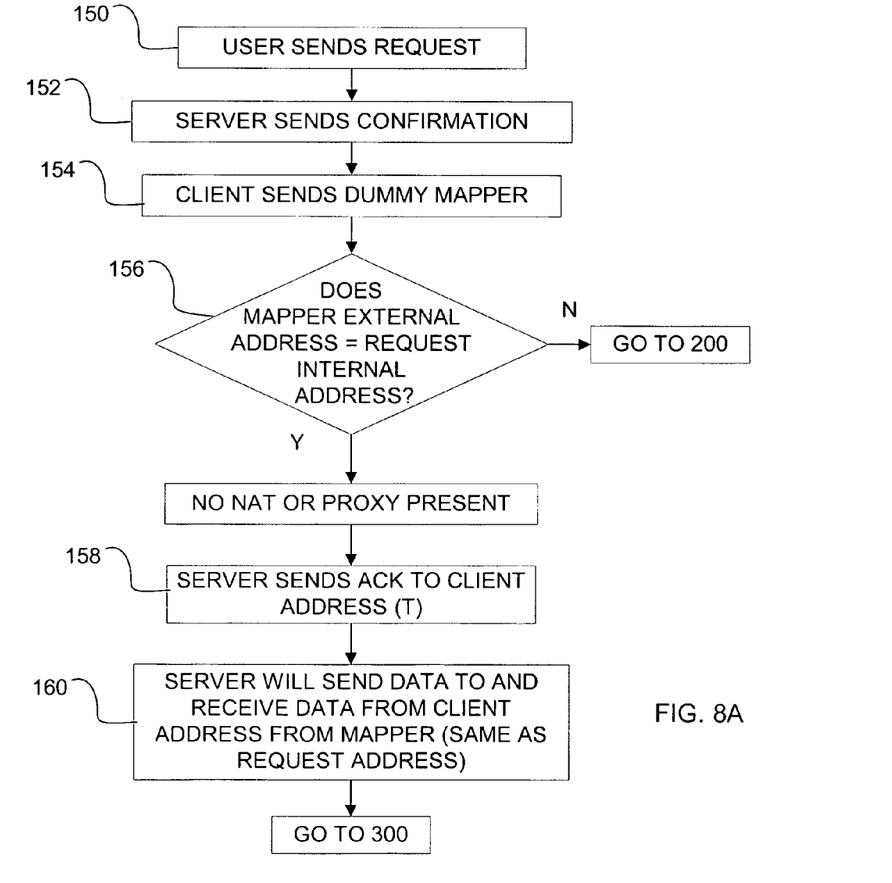
FIG. 8 is a flowchart showing exemplary steps of an embodiment of the invention.
Figure 8B:
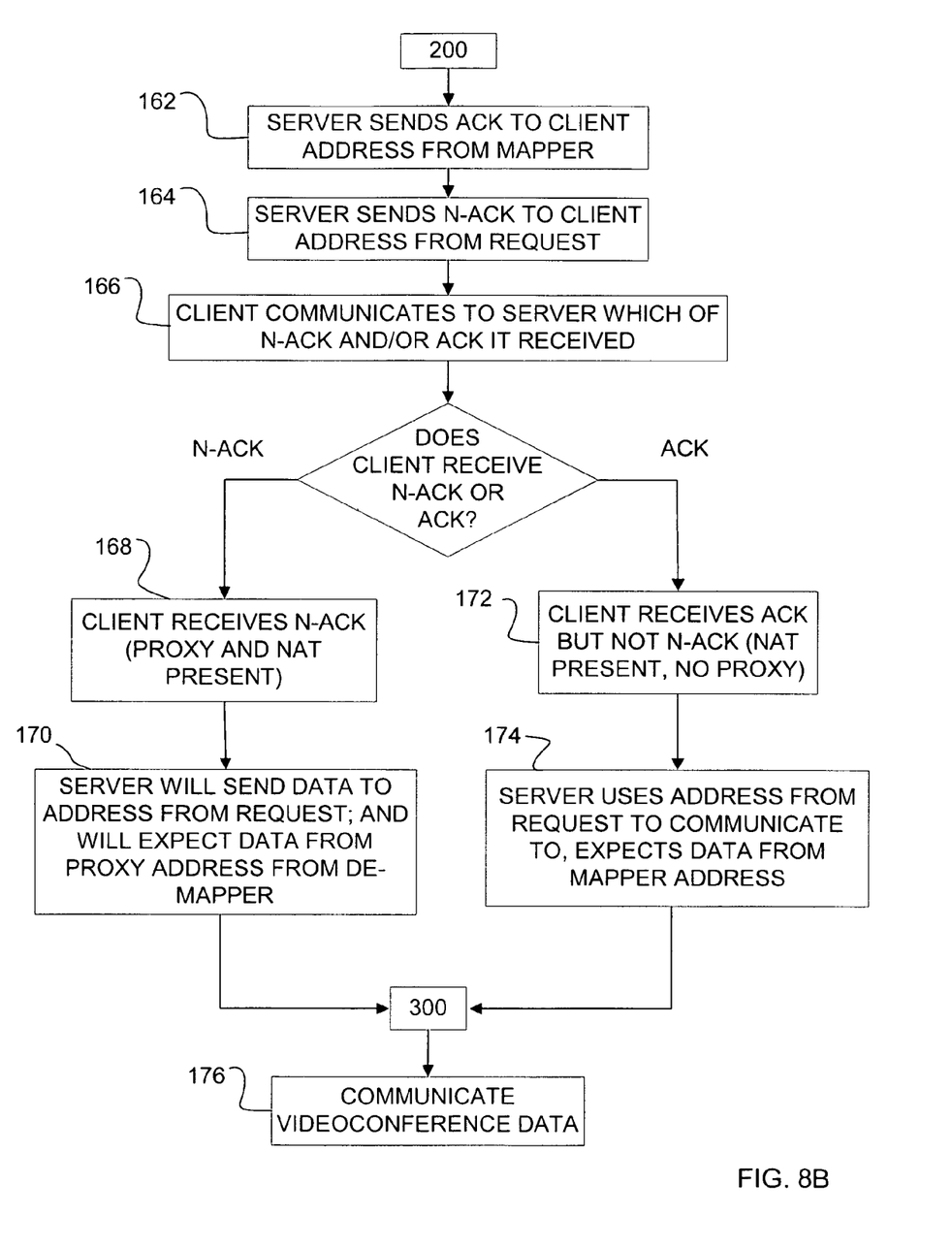

The schematic of FIG. 7 in combination with the flowchart of FIG. 8 (divided between FIGS. 8A and 8B) illustrates one exemplary set of steps for performing this discovery. Various of the block numbers of FIG. 8 have been used in the schematic of FIG. 7 to further illustrate the steps of the exemplary method. A client (such as any of the Users A-G of FIG. 1) sends a request in a first protocol that includes its address in its internal data. (block 150). The client address included therein may be the address specified by the client to receive streaming data at, which in the case of RTP data may be referred to as its RTP address. The server 12 receives the request, extracts the internal address data, and communicates a confirmation in the first protocol to the client. (block 152). The confirmation includes identifying data useful to identify the client, such as a unique session ID or codeword, and includes the conference address. (block 152). After receiving the confirmation, the client sends a mapper packet in a second protocol that has the identifying data useful to identify the client from the confirmation as internal data. (block 154). The mapper message is sent from the address specified in the previously sent request at which it is desired to receive streaming data at (e.g., the RTP address). This address will accordingly be included as external source address data with the mapper message.

The server receives the mapper packet, extracts the identifying data, uses the identifying data to identify the client, and compares the external address data from the mapper packet to the internal client address data from the request. (block 156). If the addresses are the same, then it is concluded that no NAT or proxy is present since no translation of addresses has occurred. If either of these had been present, the addresses would have been different (a NAT or proxy would have translated the mapper message external address data). The server then sends an acknowledgement or "ack" to the client (block 158), and will communicate data to and will expect data from the client address that matches the external data from the mapper message and the internal data from the request. (block 160).

If the step of comparing the address data from the mapper message external data to the request internal data address (block 156) determines that they are different, this indicates that either a NAT or a NAT and a proxy are present. Although a proxy could be present without a NAT, in practice this is uncommon. When the result of decision block 156 is negative (i.e., a difference in addresses), the method of FIG. 8 proceeds to steps of the server sending two acknowledgements in a second protocol, each to a different address. One acknowledgement is sent to the external client address from the mapper message (block 162), and a second is sent to the internal client address received in the request (i.e., the address data associated with the identifying data contained in the mapper message). (block 164). For convenience herein, the first acknowledgment may be referred to as an "ack" and the second as a "negative" acknowledgement or "n-ack." Because these two data packets are addressed differently, the client should only receive one (although both could be received in some circumstances). The client communicates which of these two is received to the server. (block 166). Which is received will indicate whether the client is separated by a NAT or a NAT and proxy combination.

The client can communicate to the server 12 which of the ack or n-ack has been received in any of a number of several possible exemplary steps. It may simply send one or more data packets, referred to herein as a de-mapper, confirming which have been received, for instance. Or it may only send a de-mapper only if a specified one of the two has been received and not send a de-mapper if the other has been received (e.g., send de-mapper only if n-ack received, but don't send anything if n-ack is not received, in which case the server will assume that a de-mapper confirms the n-ack was received and the lack of a n-ack as confirming that an ack was received).

Further, it is contemplated that the client need not communicate which of the two acknowledgments has been received. Instead, this information could be used by some other computer on the network 10, or by the client itself, to determine the NAT/proxy configuration.

If the client receives the n-ack (sent to the internal address from the request) (block 168), this suggests that both a NAT and a proxy are present. When the request was sent, the proxy intercepted it and translated the internal client address therein to a translated proxy address. This translated proxy address will be used as a "forwarding" address by the proxy; incoming data from the network will be received here and forwarded to the client.

If the client receives the ack but not the n-ack (block 172), this indicates that there is a NAT present but no proxy. The NAT 16 intercepted the mapper packet, translated the external address with a NAT translated address, and set this address up as a forwarding address. The n-ack should not be received since its destination address is not routable. If there is no proxy present, then the ack should be forwarded by the NAT to the client.

After it has been determined that no NAT/proxy is present, a NAT is present, or a NAT and a proxy are present, the method of FIG. 8 proceeds to two communication of real-time streaming data, with an example being videoconference data. (block 176).

Exemplary Steps for Resource Control

Methods of the present invention that exploit the use of a protocol such as RTSP to achieve two-way firewall penetration are not limited to use with videoconferences. Many additional applications for communication of real-time streaming data will find benefits and advantages in using methods of the invention. The present invention contemplates, for example, controlling any session- or resource-based service in a similar manner via exploitation of RTSP or similar flexible protocols. Those skilled in the art will appreciate that methods of the invention as described herein may easily be modified, for example, to facilitate a wide range of two way communications over packet based networks through security devices.

One exemplary application is connecting two or more users to one another for an IP based phone conference through one or more security devices.

Consider an IP telephone gateway application that, when launched places a call to a specified H.323 protocol endpoint, and brings that call into a specified virtual room on a conferencing platform. When the application is killed, the call is ended and the virtual room is exited. Within the context of a protocol such as RTSP, the H.323 endpoint to be called can be considered a resource and the attributes associated with that call along with the specification of which virtual room to enter may be header parameters.

An RTSP or similar SETUP request with a URL that uniquely identifies an H.323 endpoint causes resources to be allocated, and the actual call is placed upon reception of a PLAY request. Any additional information needed to place the call (i.e., launch the gateway application) is contained within header parameters of the PLAY request. This information might include a username/password for H.235 authentication, whether "faststart" or H.245 tunneling should be enabled, and which conference room this call should be placed with. The application is killed (and the call ended) upon reception of a TEARDOWN request.

Other embodiments of methods of the invention may include additional steps useful to implement a conference record/playback server. In one exemplary embodiment, one or more SETUP requests add resources (recordings) to a session object. A PLAY request launches a playback application for each of those resources. The conference "room" to be played to is identified in a header within the PLAY request. The playback applications are killed and playback stopped upon reception of a TEARDOWN request. A similar mechanism is used for the RECORD method.

Accordingly, the present invention provides numerous benefits and advantages over the prior art. For example, streaming protocols with RTSP as a preferred example can be used as to enhance a real-time, multi-user communications platform such as video conferencing and the like. Some particular benefits achieved through practice of methods of the invention include improved security and server management through steps of using RTSP and controlling the launching of conference servers and registration of endpoints. Additionally, because embodiments of the invention may be practiced as an add-on to existing applications such as videoconferencing applications, rather than a modification or replacement for any particular component, it enhances a system without impairing any existing functions. This is a valuable benefit.

Those skilled in the art will appreciate that the exemplary embodiments described and discussed herein have been selected as being exemplary only, and that the invention is not limited to these examples. For example, although exemplary invention embodiments have been illustrated that utilize the RTSP protocol, other similar protocols may also be used within the scope of the invention. Suitable similar protocols include those that are widely supported by security device providers for establishing a path through a security device for particular traffic.

By way of additional example, although invention embodiments have been illustrated with particular numbers of meeting attendees and data streams, it will be appreciated that the method of the invention may be practiced on any practical scale. Invention methods and program products may be practiced, for example, with virtual meetings that include ten or more, dozens, hundreds, or more conference rooms and/or attendees, and with real time data streams that outnumber those illustrated herein. Applications in addition to videoconferences are contemplated. Also, it will be appreciated that although exemplary method and program products have been illustrated in a particular sequence of steps, the sequence is not necessary to the invention and could easily be altered. Computer program embodiments of the invention are also not limited to a single computer, but may be practiced by a plurality of computers.

The invention claimed is:

1. A method for a plurality of clients to communicate real-time streaming data to one another over a data network, at least one of the clients being separated by a security device from the network, including the steps of:
   each of the plurality of clients communicating a request to a server, said request including a client address and a conference identifier;
   the server using said conference identifier to identify a conference address;
   the server communicating a confirmation to each of the plurality of clients in a first protocol containing said conference address;
   each of the plurality of clients communicating real time streaming data to said conference address in a second protocol;
   the security device recognizing said request and said confirmation in combination as a signal to create a rule to allow said streaming traffic in said second protocol to pass between said client and said conference address that would otherwise not be allowed to pass; and
   the server communicating said real time streaming data received from each of the plurality of clients in said second protocol received at said conference address to all others of the plurality of clients whereby the plurality of clients share real-time streaming data with each other in a bi-directional configuration.

2. A method as defined by claim 1 wherein said request is in said first protocol.

3. A method as defined by claim 1 wherein said first protocol comprises an application level standard for facilitating one-way incoming streaming data through the security device, and wherein the security device is pre-configured by its supplier to support said first protocol.

4. A method as defined by claim 1 wherein said first protocol comprises RTSP, and said request comprises a RTSP setup request, and second protocol comprises UDP.

5. A method as defined by claim 1 and further including the steps of:
   each of the plurality of clients communicating a play command in said first protocol to the server and the server initiating communication of said real-time streaming data to said each client in response to the play command;
   at least one of the plurality of clients communicating a teardown command in said first protocol to the server; and,
   said security device removing said rule and thereby denying passage to data being communicated from said conference address to the at least one client following reception of said teardown command.

6. A method as defined by claim 1 wherein said real-time streaming data comprises audio and video data, and further including the steps of the server launching a videoconference application upon receiving said request from a first of the plurality of clients to communicate said request to the server.

7. A method as defined by claim 6 and further including the steps of each of the plurality of clients communicating a teardown command in said first protocol to the server when said each of said clients exits the videoconference, and of the server shutting down the videoconference application after receiving said teardown command from the last of said each of the plurality of clients to exit the videoconference.

8. A method as defined by claim 1 wherein said client address and said conference address each comprise at least one IP address and at least one port.

9. A method as defined by claim 1 wherein said real-time streaming data comprises audio and video data, wherein said conference address comprises an IP address and a plurality of ports, one of said ports for communicating real time streaming audio data and one of said plurality of ports for communicating real time streaming video data.

10. A method as defined by claim 1 wherein the real-time streaming data comprises audio and video data, wherein said conference address includes a first address for communicating audio data and a second address for communicating video data, and wherein the at least two clients are communicating with one another in a videoconference.

11. A method as defined by claim 1 wherein implementation of said rule creates a hole in the security device through which said streaming traffic can pass between said client and conference addresses that would otherwise be blocked by the security device.

12. A method as defined by claim 1 wherein:
   said client address included in said request includes at least a client port;
   said conference address included in said confirmation includes at least a server port;
   said rule specifies said client port and said server port; and
   wherein the security device continues to block traffic communicated in the second protocol to ports other than the client port or the server port and that is therefore not subject to the rule whereby operation of the rule changes operation of the security device.

13. A method as defined by claim 1 wherein creation of said rule allows traffic to penetrate said security device without the presence of an application level gateway, tunneling or other security device add-on.

14. A method as defined by claim 1 wherein creation of said rule causes the security device to change its operation with regard to traffic communicated between the client address and the conference address as compared to traffic being communicated between other addresses.

15. A method for a plurality of clients to communicate real-time streaming data to one another over a data network during a videoconference, including the steps of:
   each of the plurality of clients internal to a firewall communicating a request to a server that is external to the firewall, said request including at least a client port range for use during the conference and a conference identifier;
   a server using said conference identifier to identify the server port range for use during the videoconference;
   the server communicating a confirmation to each of the plurality of clients in a first protocol containing said server port range, the first protocol corresponding to an application level media streaming protocol for one-way incoming streaming data;
   the firewall recognizing said request and said confirmation in combination as a signal to create a rule that changes the operation of the firewall, and as a result of receiving the combination of the request and confirmation creating a hole in the firewall through which streaming traffic can pass between the client port range and the server port range regardless of protocol and that would otherwise be blocked, the rule specifying the server port range and the client port range;

the server and each of the plurality of clients communicating real time streaming audio and video data to one another at the server port range and the client port ranges through the hole in the firewall in a second protocol that is different than the first protocol whereby the plurality of clients share real-time streaming audio and video data with one another in a bi-directional configuration during the videoconference, the second protocol being a connectionless transfer protocol that would not be allowed to pass the firewall between the clients and server if the hole in the firewall had not been created;

one of the clients communicating a tear down command to the server port range in the first protocol; and, the rule being removed from the firewall to thereby close the hole in the firewall as a result of the teardown command wherein the firewall blocks subsequent communications of the streaming data between the server port range and the client port ranges communicated in the second protocol.

16. A method as defined by claim 15 wherein the first protocol comprises RTSP and the second protocol comprises UDP.

17. A method as defined by claim 15 wherein the rule is created and the hole through the firewall is made after receiving the confirmation.

18. A method as defined by claim 15 wherein the firewall continues to block communications in the second protocol that are not being communicated between the server port range and the client port range while data communicated in the second protocol through the hole is allowed to pass, whereby implementation of the rule causes the firewall to treat data in the second protocol passing through the hole differently than other data in the second protocol.

19. A method as defined by claim 15 wherein the rule is created after a play command passes through the firewall.

20. A system for communicating real-time streaming data over a data network, comprising:

a server;

a security device; and a plurality of clients, wherein at least one client is separated by said security device from the network, and wherein each of said plurality of clients is configured to communicate a request to the server, said request including a client address and a conference identifier, wherein said server is configured to use said conference identifier to identify a conference address, and communicate a confirmation to each of said plurality of clients in a first protocol containing said conference address, wherein each said client is further configured to communicate real time streaming data to said conference address in a second protocol, wherein said security device is configured to recognize said request and said confirmation in combination as a signal to create a rule to allow said streaming traffic in said second protocol to pass between said client and said conference address that would otherwise not be allowed to pass, wherein said server is further configured to communicate said real time streaming data received from each of said plurality of clients in said second protocol received at said conference address to all others of said plurality of clients whereby said plurality of clients share real time streaming data with each other in a bi-directional configuration.

* * * * *